Figure 1:
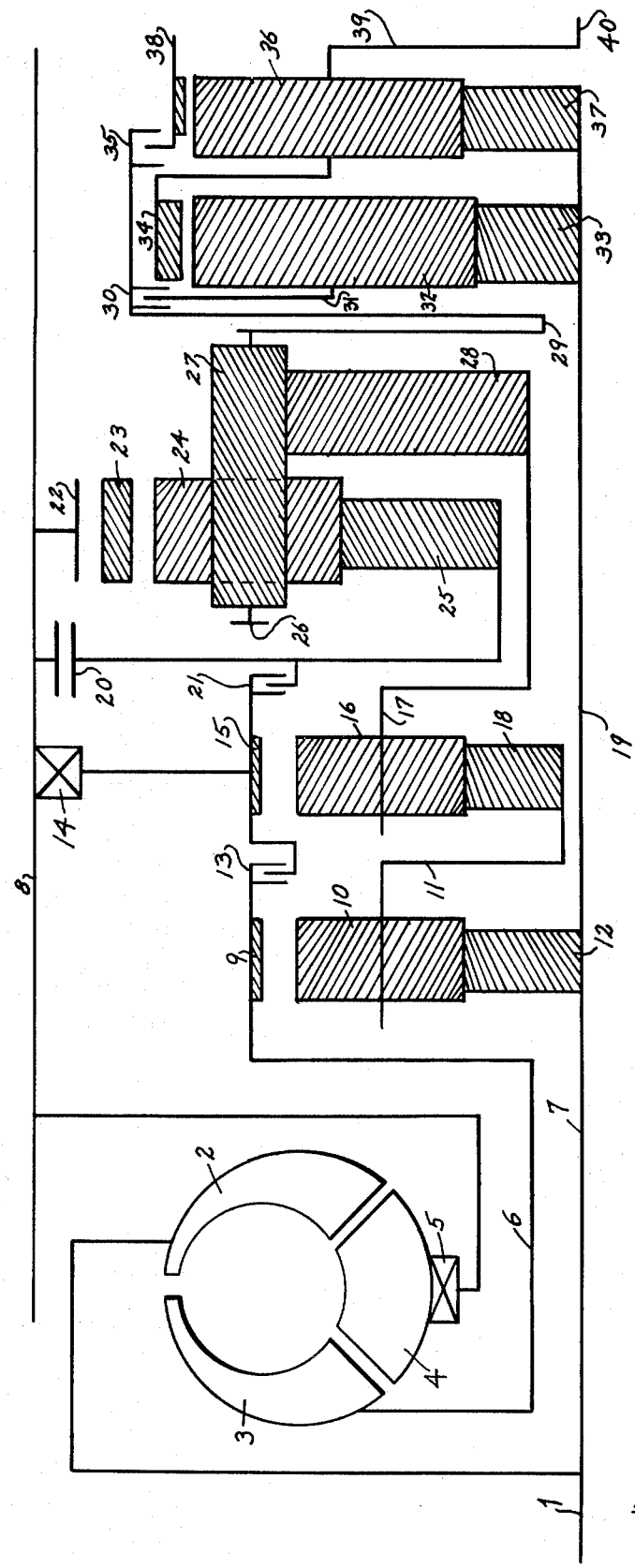

United States Patent [19]
Welch

[11] 3,722,323
[45] Mar. 27, 1973

[54] TRANSMISSION

[76] Inventor: Arthur L. Welch, Star Rt., Wasilla, Alaska 99687

[22] Filed: Mar. 16, 1971

[21] Appl. No.: 124,764

[52] U.S. Cl. ..................74/681, 74/761, 74/769, 74/678
[51] Int. Cl. ......F16h 37/06, F16h 57/10, F16h 47/08
[58] Field of Search.....................74/681, 761, 769

[56] References Cited

UNITED STATES PATENTS

| | | | |
|---|---|---|---|
| 2,546,378 | 3/1951 | Winther | 74/761 X |
| 2,627,764 | 2/1953 | Mayner | 74/688 X |
| 3,021,729 | 2/1962 | Chambers et al. | 74/769 X |
| 3,033,333 | 5/1962 | Breting et al. | 74/769 X |
| 3,191,459 | 6/1965 | Welch | 74/688 |
| 3,292,455 | 12/1966 | Welch | 74/688 |
| 3,381,546 | 5/1968 | Holl | 74/761 |
| 3,507,168 | 4/1970 | Carp | 74/688 |
| 3,518,898 | 7/1970 | Wagner | 74/688 X |

*Primary Examiner*—Arthur T. McKeon

[57] ABSTRACT

A two stage hydrodynamic and planetary split torque transmission having a first stage of a hydraulic torque converter and a plurality of planetary gearsets and an extension of a driving shaft transmitting hydraulic and direct drive power to a second stage of a planetary split torque transmission mechanism beyond. The torque converter supplies hydraulic power to the reaction members of the first stage gearsets while the driving shaft supplies power directly to the input member of the first gearset, effecting an infinite range of part hydraulic part direct driven gear ratios ranging infinitely from near maximum reduction to direct drive in the first stage. The driving shaft extension supplies power directly to the input members of the second stage planetary transmission mechanism having forward and reverse drive gearsets, while the first stage hydraulic and planetary transmission supplies power of indifinitely variable speed and torque to the second stage planetary gearset reaction members. Since ample torque is available from the first stage to provide reaction for a very low ratio second stage planetary mechanism, a transmission having a very wide range of infinitely variable ratios results. A formula for determining split torque ratios in planetary gearsets operating in split torque drive is given.

3 Claims, 2 Drawing Figures

INVENTOR.
ARTHUR L. WELCH.

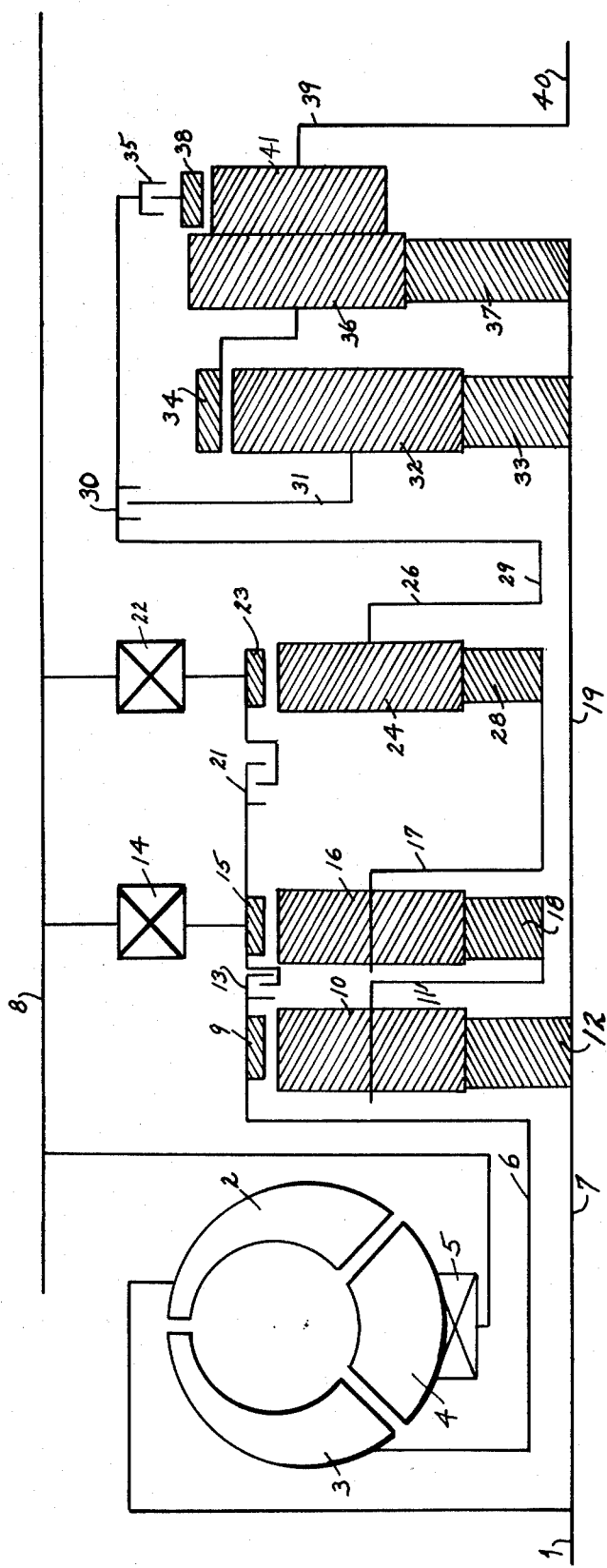

TRANSMISSION

This invention relates to hydrodynamic and planetary split torque transmissions.

In most hydrodynamic and planetary mechanisms one-half or more of the available power is routed through the hydraulic torque converter, with the balance routed through the planetary gearsets. In the transmission of the present invention about one-quarter of the available power is transmitted through the hydraulic torque converter of the first stage, with about one-quarter going through the planetary gearsets of the first stage. The other one-half of the power is routed by way of the driving shaft to the second stage planetary mechanism where it is combined with the power routed through the first stage and transmitted through the transmission driven shaft to the load beyond. Since hydraulic torque converters waste about 20 percent of the power put into them, as heat, it can be seen that with only one-quarter of the total available power going through the torque converter the fraction of the total power wasted will be only about 5 percent instead of 20 percent.

Therefore the main object of the invention is a more efficient hydrodynamic and planetary split torque transmission mechanism.

In the past highway trucks driven by hydraulic torque converters have not been accepted because of the efficiency loss. It is anticipated that the better efficiency of the present transmission will render it acceptable for highway truck use.

Another object of the transmission is split torque drive in reverse gear, which is not possible unless the reaction member of the gearset is rotated in a reverse direction, in the second stage of the transmission.

These objects will be explained in the following specification.

In the drawings which form part of the specification, FIG. 1 shows the transmission with reverse gear mechanism in the first stage so reverse in the second stage will be split torque. FIG. 2 shows the first stage without reverse, so reverse in the second stage is conventional drive. Parts in the two figures which perform like functions have like numbers in each Figure.

Referring to the drawings the transmission of the invention embodies a first stage mechanism comprising a hydraulic torque converter shown by numerals 2 to 5, and a planetary gear train shown by numbers 6 through intermediate shaft 29, excluding intermediate shaft 19, which transmits driving shaft 1 power to the second stage planetary gear mechanism shown by numerals 30 through 39.

The first stage has hydraulic torque converter pump 2 driven by driving shaft 1. Alongside pump 2 is turbine 3 which is turned by fluid pumped by pump 2. The vanes of pump 2 are slanted backwards so they will expell fluid centrifugally when pump 2 is rotated. The vanes of turbine 3 are shaped to receive the fluid thrown outward by pump 2, the shape of the vanes of the turbine 3 extracting power from said fluid. This power causes turbine 3 to rotate forwardly, in the same direction as pump 2 and driveshaft 1. When turbine 3 turns slower than pump 2 the fluid strikes the vanes of the turbine 3 at a sharper angle, thus exerting more force on said vanes of the turbine 3, which causes turbine 3 to exert more torque on hollow shaft 6, so torque multiplication prevails. This flexibility of speed and torque that turbine 3 exhibits is of great importance. When the fluid exits from the inner ends of the vanes of the turbine 3 it is going backwards to the direction of pump 2 rotation so reactor 4 has vanes which redirect the fluid to a forward direction so pump 2 will not cavitate. Since the backwards flowing fluid would cause reactor 4 to rotate backwards freewheel 5 is placed between transmission case 8, which is stationary and houses the complete transmission in coaxial alignment, and reactor 4 to prevent rearward rotation of said reactor 4 but allow free forward rotation of reactor 4 when turbine 3 rotates about 85 percent of pump 2 speed, at which speed the fluid strikes the backsides of reactor 4 vanes and urges it forward. From there on to matched speeds of pump 2, turbine 3, and reactor 4 very little torque multiplication prevails, the torque converter operating as a fluid coupling at 1 to 1 torque ratio.

The rest of the first stage of the transmission and the second stage is comprised of planetary gearsets and brakes and clutches to actuate and control it.

All planetary gearsets have an input member, an output member, and a reaction member. In all the drawings input members are shown by numerals 12, 18, 28, 33, and 37, all of which are sun gears in the gearset arrangements shown. Said sun gears mesh with pinion gears 10, 16, 24, 27, 32, and 36, which mesh with and react against gearset reaction members which are ring gears shown by numerals 9, 15, 23, and 38, except that reaction in reverse drive gearset of the second stage is provided by pinion gear carrier 31, and forward drive in the third gearset species of the first stage shown in FIG. 1 has sun gear 25 as reaction member. The gearset output members for all gearsets operating in forward drive are pinion gear carriers 11, 17, 26, and 39. Output or driven shaft 40 which transmits the whole transmission power output is connected to pinion gear carrier 39 and transmits power to the load beyond. In the first stage of the transmission a reverse gear is shown so the second stage reverse drive will operate in split torque drive. In the first stage reverse the reaction member is ring gear 23, because the double pinions reverse the direction of the carrier rotation, and in the second stage the reverse drive reaction member is carrier 31 and the output member is ring gear 34. In FIG. 2 the second stage forward drive gearset has stepped pinion gears 36–41 to get lower ratios in forward drive.

In the power flow through the transmission the driving shaft 1 supplies power from a power source not shown to the torque converter, as explained above, and also to the first gearset input member which is sun gear 12. Torque converter turbine 3 transmits hydraulic power through sleeveshaft 6 to ring gear 9. This is the conventional power split of the prior art. In the present invention part of the power goes on through intermediate shaft 19 to the second stage planetary gearset input members which are sun gear 33 for reverse drive and sun gear 37 for forward drive. Or the first intermediate shaft 19 might be a separate driving shaft driven by a second power source not shown. In the first stage of the transmission the power transmitted to the torque converter is carried by the hollow shaft 6 to the front gearset hydraulic drive member which is ring gear 9. The split power is combined in the front gearset through the meshing of pinion gears 10 with sun gear 12 and ring gear 9 and transmitted by the pinion gear carrier 11 to the second gearset input member 18. This sun gear 18 meshes with pinion gears 16 which react against ring gear 15, held from rearward rotation by one-way brake 14 anchored to the inside of transmission case 8. This brake 14 and all the other brakes of the transmission can be either band or disc type if holding means in both directions is needed, or it can be one way or freewheel type if holding only in one direction is needed. All of these brake types are well known. The power received by sun gear 18 is mechanically multiplied in the second gearset and transmitted through the pinion gear carrier 17 to third gearset input member sun gear 28 which meshes with long pinion gears 27 which mesh with pinion gears 24 which mesh with and react against reaction sun gear 25, held against rotation by brake 20, which must be releasable for reverse drive operation of the transmission. The mechanically multiplied power is transmitted through pinion gear carrier 26 to second intermediate shaft 29 which transmits the first stage power output to the second stage of the transmission. When the second stage load permits the torque converter's power output by turbine 3 is transmitted through sleeveshaft 6 to ring gear 9 and on to the second gearset reaction member ring gear 15 by engaging clutch 13, which will generally be a hydraulically actuated multiple disc clutch of well known construction. The engaging of clutch 13 overrides brake 14 and causes hydraulic power to take over part of the load of both the first and second gearsets. When this load has been accelerated by turbine 3 so turbine 3 turns at nearly matched speed of turbine 3 and pump 2 or near direct drive, clutch 21 is engaged to connect the third gearset reaction member sun gear 25 to ring gear 15, causing turbine 3 to assume part of the load of the whole first stage of the transmission. The change of each reaction member from mechanical to hydraulic drive and the acceleration of said reaction members is accomplished smoothly and without noticeable steps in the ratios, the ratio changes being infinitely varied from maximum reduction in the gearset to direct drive, because when the next gearset reaction member is connected to the preceding one and thus changed to hydraulic drive the torque converter will adjust to the load.

The fact that the turbine is not overcome and caused to rotate backwards when the second and third reaction members are connected to the first one, as long as the turbine speed does not drop below a predetermined speed, is due to the drop in ratio which occurs in planetary gearsets when the reaction member is rotated part of a turn while the input member is rotated one turn. This is the principle of split torque drives, and is what makes them possible.

No matter how low ratio gearsets are used, if the reaction members are rotated one-half turn while the first gearset input member rotates one turn, the ratio of the first input member to the last output member is never more than 2 to 1. Also if the reaction member is rotated one-quarter turn while the input member is rotated 1 turn the ratio in gearsets of up to 5 turns input to 1 turn output is never lower than 4 to 1. This is shown in the ratio tables below.

As stated above when the reaction member of a planetary gearset is rotated part of a turn while the input member is rotated one turn the number of turns of the input member needed to effect one turn of the output member decreases.

The easiest way to explain this is to say that in split torque drive the gearset is driven from both ends, that is the reaction member also becomes an input member. It is obvious that if input, reaction, and output members all rotate at equal speeds direct drive results. Thus in a 2 to 1 ratio gearset, the output member will be advanced equal amounts by equal parts of a turn of input and reaction members because they are the same size. With the sun gear, pinions in a carrier, ring gear arrangement, 2 to 1 ratio could occur only with the stepped pinion gears of FIG. 2 second stage forward drive gearset, in which the pinion gears 36–41 are turned around from the arrangement shown so higher ratios are obtained instead of the lower ratios shown. When the input and reaction members are equal size one-half turn of each member advances the output member one-quarter turn for a total of one-half turn, or 1 to 1 ratio in the gearset.

With gearsets of other ratios the input and reaction members will cause different advances of the output member. When the gearset ratio is more than 2 turns input member to 1 turn output member the ratio of input turns will drop more than when the ratio of input to output is less than 2 turns to 1. With gearsets of great reduction, that is several turns of input member to 1 turn of output, the drop is startling. Calculations for a number of different ratio gearsets have been made and are given below. One table shows gearsets with the reaction members turned one-quarter turn for each turn of input member, the other with the reaction members turned one-half turn to each turn of first gearset input member. In the 2 and 3 gearset columns the reaction members are locked together and are turned as one. A formula for determining the ratios in split torque drive gearsets is given following the tables.

RATIOS OF GEARSETS OPERATING IN SPLIT TORQUE DRIVE

| Base Ratio | 1 gearset | 2 gearsets | 3 gearsets |
|---|---|---|---|
| 3 to 1 | 2 to 1 | 3 to 1 | 3.56 to 1 |
| 5 to 1 | 2.5 to 1 | 3.57 to 1 | 3.91 to 1 |
| 20 to 1 | 3.45 to 1 | | |

In the table above reaction members are turned one-quarter turn to 1 turn input member. In the table below reaction members are turned one-half turn to 1 turn of input member.

| Base Ratio | 1 gearset | 2 gearsets | 3 gearsets | Total 3 Sets |
|---|---|---|---|---|
| 2 to 1 | 1.33 to 1 | 1.61 to 1 | 1.78 to 1 | 8 |
| 3 to 1 | 1.5 to 1 | 1.70 to 1 | 1.98 to 1 | 27 |
| 3.6 to 1 | 1.56 to 1 | 1.78 to 1 | 1.98 to 1 | 47 |
| 5 to 1 | 1.66 to 1 | 1.92 to 1 | 1.98 to 1 | 125 |
| 20 to 1 | 1.92 to 1 | 1.98 to 1 | 2 to 1 | 8000 |

In the table of one-half turn reaction member to 1 turn input member further calculation shows that the ratio never goes above 2 to 1 matter how many gearsets are added, nor how low the base ratio is in the gearsets.

In the table of ratios at one-quarter turn reaction member to 1 turn input member it can be seen that with three 5 to 1 ratio gearsets operating in split torque drive the total ratio will be less than 4 to 1, so a torque converter will provide reaction for three 5 to 1 gearsets as long as the turbine 3 rotates at one-quarter driving shaft 1 speed or faster. With three 5 to 1 gearsets the total ratio with the first gearset operating in split torque drive at 2.5 to 1 ratio and the following 2 gearsets operating in maximum reduction of 5 to 1 each is 62.5 turns driving shaft 1 to 1 turn of second intermediate shaft 29 which is the first stage output shaft and the input shaft of the second stage.

With a 20 to 1 ratio gearset for forward speed in the second stage of the transmission and with the first stage providing reaction power to the second stage reaction member 38 through intermediate shaft 29 and clutch 35, the ratio of driving shaft 1, which drives second stage forward speed input member 37 through the first intermediate shaft 19, to driven shaft 40 is 15.15 turns of driving shaft 1 to transmission output or driven shaft 40, which transmits the combined output of the first and second stages of the transmission collected in second stage planetary gearset output member 39 to the load beyond.

In planetary gearsets operating in split torque drive the output member is advanced by both the input member and the reaction member. The advance from the input member is constant because the input member always turns 1 turn. The advance of the output member caused by the turning of the reaction member varies as the speed of the torque converter turbine 3 varies. So to get the ratio in the gearset at any particular speed of reaction member relative to the input member speed the output member advance caused by each must be determined and the two added together. The sum, in percentage of a full turn, is divided into 1 to get the ratio. For example if the input member causes one-half turn advance and the reaction member one-quarter turn advance of the output member the total is 75 percent of a turn divided into 1 gives 1.33, the ratio of input to output.

It can readily be seen that if both input and reaction members turn 1 turn the total of percentages of output member advance caused by each member will equal 1, so the gearset is operating in direct drive, at 1 to 1 ratio.

To determine how much each gearset member causes the output member to advance the ratios of each must be determined. In the conventional sun, ring, and pinion gears in a carrier arrangement, in which the carrier acts as output member and rotates in a forward direction, the number of teeth in the input member is divided into the number of teeth in the reaction member and 1 turn is added to the quotient obtained. This sum, which is the ratio of the gearset, is divided into 1 to get the percentage of a turn the output member is advanced by that input member. When both percentages have been obtained they are added together, and will equal 1, or direct drive. When the reaction member is turned a fraction of the input member's turn the amount this fraction causes the output member to advance is determined, in percentage of a turn, and this is added to the advance caused by the input member's turning and the sum is divided into 1 to get the ratio, as related above.

When two gearsets have ring gears locked together and turned by one torque converter turbine the second gearset input member is turned by the first gearset output member so it does not turn as fast as the first gearset input member. The speed it turns is determined by multiplying the total amount the first gearset output member advances by the amount the output member was advanced by the turning of the first input member. The product obtained is added to the advance caused by turning the reaction member and the sum is divided into 1 to get the ratio in the second gearset. For the third gearset the amount the second gearset output member turns is again multiplied by the amount the first output member advanced from the turning of the input member and the product added to the reaction member caused output advance and divided into 1 to get the third gearset, and the whole first stage, ratio.

The results obtained using this empirical formula to determine the ratios in three 3.6 to 1 ratio gearsets agree very closely with ratios obtained from connecting three gearsets together in series and manually turning the front gearset input member and all of the reaction members and visually observing the ratios obtained, before the formula was evolved.

In the description above of the power flow through the first stage of the transmission the combined hydraulic power from turbine 3 and mechanically transmitted power from driving shaft 1 is collected in the third gearset and transmitted through third gearset output member 26 and the attached second intermediate shaft 29 to the second stage forward drive first stage driven connecting clutch 35. When clutch 35 is engaged it transmits the first stage power to ring gear 38 which is the second stage forward drive first stage driven member. The power output of the first stage thus drives the ring gear 38 slowly forward in starting the transmission. The direct drive power transmitted through first intermediate shaft 19 to sun gear 37, the second stage forward drive gearset input member combines with the first stage power transmitted by ring gear 38 to drive the second stage forward drive gearset output member which is carrier 39, through meshing of said sun gear 37 and ring gear 38 with planet pinions 36 rotatably mounted in carrier 39. The force exerted on pinions 36 through this meshing with sun gear 37 and ring gear 38 causes carrier 39 to rotate forwardly and drive the attached transmission output or driven shaft 40. The second stage forward drive gearset always operates in split torque drive, that is part direct driven, part first stage driven, and since the first stage is low enough geared to provide ample torque to drive the first stage driven member 38 said member will always be turned so the gearset will never operate at maximum reduction. Because of this the gearset should be very low ratio. The stepped pinion gears of FIG. 2 will allow ratios as low as necessary. In FIG. 2 the sun gear 37 meshes with large pinion gears 36 which are attached to small pinion gears 41 which mesh with and react against ring gear 38. The stepped pinion gears 36–41 effect a reduction in ratio between sun gear 37 and ring gear 38 rather than acting as idler gears which the pinion gears of the other sun-ring gears and carrier arrangement gearsets do.

The operation of the gearset arrangement shown in FIG. 2 is the same in forward speed of the first stage as that described for FIG. 1. Reverse speed in the second stage is different between the two Figures because in FIG. 1 there is a reverse speed in the first stage third gearset, while in the first stage of FIG. 2 there is no reverse. In FIG. 2 the reverse speed planetary gearset sun gear 33 meshes with pinion gears 32 which are rotatable in their carrier 31 which is driven by clutch 30, which is first stage driven by intermediate shaft 29 which rotates slowly forward. Pinion gears 32 also mesh with ring gear 34 which is the reverse speed output member of the transmission. Ring gear 34 transmits the reverse drive power through driving means connecting the ring gear 34 to forward speed carrier 39 to shaft 40 and the load beyond. Ring gear 38 and pinion gears 36 of the forward speed runs idle in reverse operation.

In FIG. 1 the reverse speed in the first stage has sun gear 28 as input member. The long pinion gears mesh with sun gear 28 and with short pinion gears 24 which mesh with and react against ring gear 23. The carrier 26 transmits the whole output of the first stage to the second stage through second intermediate shaft 29 and clutch 30 which holds pinion gear carrier 31. Power transmitted directly from driving shaft 1 through intermediate shaft 19 to sun gear 33 which meshes with pinion gears 32 which causes ring gear 34 to rotate backwards to give reverse rotation to the output shaft 40, as related above.

Since the third gearset output member 26 rotates backwards to the driving shaft 1 and to second gearset output member 17 the speed at which output member 26 is rotated can be varied from near maximum reduction in the first two gearsets to matched speed between second output member 17 and intermediate shaft 19, or direct drive in the first two gearsets so since third output member 26 turns backwards the reverse speed reaction member 31 of the second stage will rotate backwards at considerable speed. This rotation will serve to speed up the second stage reverse speed output member 34 by lowering the ratio in the second stage reverse drive gearset through turning the first stage driven member in the same direction as gearset output member 34 rotates, effecting variable speed reverse rotation of output shaft 40.

This variable speed reverse independent of driving shaft 1 speed is desirable for some applications. As shown, the reverse rotation of shaft 40 cannot match the forward speed rotation of shaft 40, which can be as fast as driving shaft 1, but ordinarily reverse speed equal to forward speed is not needed. By using a high reverse speed ratio in the first stage the reverse speed of output shaft 40 can be at least half as fast as forward speed. For vehicles which require slower reverse speed operation the arrangement of FIG. 2 will give speeds comparable to present transmissions.

As explained above the second stage planetary gearset can be operated through the full range of split torque ratios from near maximum reduction to direct drive, in forward speed. This range of infinitely variable split torque ratios is made possible because of the very low reduction and stepless range of split torque ratios in the first stage of the transmission.

Manual rotation of a 5.5 to 1 ratio in reverse speed planetary gearset shows three-quarters of a turn of the output member to 1 turn of input member and one-half turn of reaction member. Applicant has no formula for reverse speed ratio calculations, but even with 15 to 1 ratio gearsets the speed should still be over one-half forward speed. Also with over one-half reaction member rotation achieved by a higher ratio reverse speed gearset in the first stage, the second stage reverse speed can be increased.

I claim as my invention an improvement

1. In a hydrodynamic and planetary split torque transmission; a transmission case housing a driving shaft, a first intermediate shaft connected to said driving shaft, a transmission output shaft, and a second intermediate shaft surrounding said first intermediate shaft, a first stage part hydraulic part direct drive power train surrounding said driving shaft and said first intermediate shaft, and a second stage part direct driven part first stage driven planetary power train driven by said first and second intermediate shafts; said first stage part hydraulic part direct driven power train including a hydraulic torque converter and a plurality of planetary gearsets, said torque converter having a pump, turbine, and a reactor, said pump driven by said driving shaft, said turbine driven by fluid circulated by said pump, said reactor being mounted to prevent reverse rotation and adapted to change the ratio of torque transmitted between said pump and turbine, each of said planetary gearsets except the first one having an input member, a reaction member adapted to be hydraulically driven, and an output member, said first gearset having an input member driven by said driving shaft, a hydraulically driven member, power transmitting means connecting said hydraulically driven member to said torque converter turbine, and an output member, brake means between each gearset reaction member and the transmission case, connecting clutch means between said first gearset hydraulically driven member and the following gearset reaction member, and connecting clutch means between each two following gearset reaction members, said planetary gearsets being connected together in series, front gearset output member connected to following gearset input member, said second intermediate shaft being connected to said last gearset output member, said front gearset always operating in part hydraulic part direct drive, said following gearsets operating in either mechanical drive at maximum reduction with their reaction members held from rearward rotation by said brake means, or in part hydraulic part direct drive hydraulic power being transmitted from the first gearset hydraulically driven member to the following gearset reaction members through said connecting clutch means in sequence when the associated clutch means is engaged, the part hydraulic part direct drive effecting an infinite range of ratios from near maximum reduction to direct drive between said driving shaft and said second intermediate shaft; said second stage planetary power train including a forward drive planetary gearset and a reverse drive planetary gearset, each of said gearsets having an input member driven by said first intermediate shaft, a first stage driven member, an output member, driving means between said reverse drive and forward drive gearset output members, driving means connecting said transmission output shaft to said forward drive gearset output member, and connecting clutch means between each of said first stage driven members and said second intermediate shaft, the combined power output of the first stage driven second intermediate shaft and the direct driven first intermediate shaft effecting an infinite range of forward speed ratios from near maximum reduction to direct drive when the associated connecting clutch is engaged and the transmission first stage is run through the full range of part hydraulic part direct drive ratios; said reverse drive gearset effecting reverse rotation of the forward drive output member and the attached transmission output shaft when the associated connecting clutch is engaged.

2. The transmission of claim 1 in which the first stage has forward and reverse drive means in the last planetary gearset, said gearset having a forward drive input member, reaction member adapted to hydraulic drive, brake means between said reaction member and the transmission case, and connecting clutch means between said reaction member and the preceding gearset reaction member, and output member, said reverse drive having a reverse drive reaction member, brake means between said reaction member and the transmission case, and connecting clutch means between said reaction member and the preceding gearset reaction member, input member, and output member, said forward drive means having a sun gear acting as input member, another sun gear acting as reaction member, long pinion gears meshing with the input sun gear and meshing with short pinion gears which mesh with said reaction sun gear, said long and short pinion gears imparting rotation to a carrier acting as output member through rotatable mounting therein; said reverse drive means having a sun gear acting as input member, long pinion gears meshing with said sun gear, said long pinion gears meshing with short pinion gears which mesh with a ring gear acting as reaction member, said long and short pinion gears imparting rotation to a carrier acting as output member through rotatable mounting therein.

3. The transmission of claim 1 in which said first stage planetary gearsets and the forward drive gearset of the second stage have a sun gear acting as input member, a ring gear acting as reaction member, and a carrier having rotatably mounted pinion gears meshing with said sun and ring gears acting as output member; and in which said second stage reverse drive gearset has a sun gear acting as input member, a ring gear acting as output member, and a carrier having rotatably mounted pinion gears meshing with said sun and ring gears acting as reaction member, said ring gear having driving means connecting it to the forward drive pinion gear carrier so the reverse drive passes through said carrier to the attached transmission output shaft, the pinion gears and ring gear of the forward drive idling backwards in reverse drive.

* * * * *